US010601024B2

(12) United States Patent
Chevrier

(10) Patent No.: US 10,601,024 B2
(45) Date of Patent: Mar. 24, 2020

(54) ANODE MATERIALS FOR LITHIUM ION BATTERIES AND METHODS OF MAKING AND USING SAME

(71) Applicant: JOHNSON MATTHEY PUBLIC COMPANY LIMITED, London (GB)

(72) Inventor: Vincent J. Chevrier, St. Paul, MN (US)

(73) Assignee: Johnson Matthey Public Company Limited, London (GB)

( * ) Notice: Subject to any disclaimer, the term of this patent is extended or adjusted under 35 U.S.C. 154(b) by 163 days.

(21) Appl. No.: 15/531,517

(22) PCT Filed: Dec. 1, 2015

(86) PCT No.: PCT/US2015/063088

§ 371 (c)(1),
(2) Date: May 30, 2017

(87) PCT Pub. No.: WO2016/089811

PCT Pub. Date: Jun. 9, 2016

(65) Prior Publication Data

US 2018/0337390 A1 Nov. 22, 2018

Related U.S. Application Data

(60) Provisional application No. 62/085,920, filed on Dec. 1, 2014.

(51) Int. Cl.
*H01M 4/02* (2006.01)
*H01M 4/38* (2006.01)
(Continued)

(52) U.S. Cl.
CPC ............... *H01M 4/02* (2013.01); *C01B 32/20* (2017.08); *H01M 4/134* (2013.01); *H01M 4/386* (2013.01);
(Continued)

(58) Field of Classification Search
CPC ........ H01M 4/02; H01M 4/134; H01M 4/485; H01M 4/386; H01M 4/364; H01M 4/587;
(Continued)

(56) References Cited

U.S. PATENT DOCUMENTS 6,680,145 B2 1/2004 Obrovac
6,855,460 B2 * 2/2005 Vaughey ............... C22C 1/0491
429/218.1
(Continued)

OTHER PUBLICATIONS

Dahn, "User-Friendly Differential Voltage Analysis Freeware for the Analysis of Degradation Mechanisms in Li-Ion Batteries" J. Electrochem. Soc. 2012, vol. 159, No. 9, pp. A1405-A1409.
(Continued)

*Primary Examiner* — Amanda C. Walke
(74) *Attorney, Agent, or Firm* — BakerHostetler

(57) ABSTRACT

An electrochemically active material includes, prior to incorporation in an electrochemical full cell, reversible lithium corresponding to between 4% and 50% of the reversible capacity of the electrochemically active material. The electrochemically active material has a lithium consumption rate between 0.05% and 0.2%.

20 Claims, 3 Drawing Sheets voltage
cathode lith
full cell capacity
rev prelith
N/P = 1.1
anode delith
total prelith
anode lith
mAh/cm2

(51) Int. Cl.

*H01M 4/134* (2010.01)
*C01B 32/20* (2017.01)
*H01M 4/62* (2006.01)
*H01M 10/052* (2010.01)
*H01M 4/587* (2010.01)
*H01M 4/36* (2006.01)

(52) U.S. Cl.

CPC ......... *C01P 2004/80* (2013.01); *H01M 4/364* (2013.01); *H01M 4/587* (2013.01); *H01M 4/625* (2013.01); *H01M 10/052* (2013.01)

(58) Field of Classification Search

CPC .. H01M 4/625; H01M 10/052; H01M 10/058; H01M 10/446; C01B 32/20; C01P 2004/80

USPC .......................................................... 429/209

See application file for complete search history.

(56) References Cited

U.S. PATENT DOCUMENTS 7,871,727 B2 1/2011 Obrovac
7,906,238 B2 3/2011 Le
8,021,496 B2 9/2011 Yakovleva
8,071,238 B2 12/2011 Le
8,133,374 B2 3/2012 Takezawa
8,241,793 B2 8/2012 Zhamu
8,753,545 B2 6/2014 Obrovac
2005/0079421 A1* 4/2005 Konishiike ............. H01M 4/13 429/231.95
2006/0228468 A1 10/2006 Lain
2008/0206641 A1 8/2008 Christensen
2008/0237536 A1* 10/2008 Sano ....................... H01M 4/13 252/182.1
2009/0305131 A1* 12/2009 Kumar .................. B22F 3/1146 429/206
2010/0119942 A1* 5/2010 Kumar .................... H01M 4/38 429/220
2011/0111304 A1* 5/2011 Cui ..................... H01M 4/0421 429/231.8
2012/0105007 A1 5/2012 Amiruddin
2013/0327648 A1 12/2013 Grant
2014/0272584 A1 9/2014 Jiang
2017/0301910 A1* 10/2017 Wang .................... H01M 4/623
2018/0062168 A1* 3/2018 Gonser ................ H01M 4/386

OTHER PUBLICATIONS

Obrovac, "Alloy Design for Lithium-Ion Battery Anodes", J. Electro chem. Soc., 2007, vol. 154, No. 9, pp. A849-A855.

Seong, "Electrochemical behavior of a lithium-pre-doped carbon-coated silicon monoxide anode cell", Journal of Power Sources, 2009, vol. 189, pp. 511-514.

International Search report for international application No. PCT/US2015/63088 dated Feb. 12, 2016, 3pages.

* cited by examiner

ANODE MATERIALS FOR LITHIUM ION BATTERIES AND METHODS OF MAKING AND USING SAME

CROSS REFERENCE TO RELATED APPLICATIONS

This application is a national stage filing under 35 U.S.C. 371 of PCT/US2015/063088, filed Dec. 1, 2015, which claims the benefit of U.S. Provisional Application No. 62/085,920, filed Dec. 1, 2014, the disclosure of which is incorporated by reference in its/their entirety herein.

FIELD

The present disclosure relates to compositions useful in anodes for lithium ion batteries and methods for preparing and using the same.

BACKGROUND

Various anode compositions have been introduced for use in lithium-ion batteries. Such compositions are described, for example, in U.S. Pat. Nos. 7,871,727, 7,906,238, 8,071, 238, and 8,753,545.

SUMMARY

In some embodiments, an electrochemically active material is provided. The electrochemically active material includes, prior to incorporation in an electrochemical full cell, reversible lithium corresponding to between 4% and 50% of the reversible capacity of the electrochemically active material. The electrochemically active material has a lithium consumption rate between 0.02% and 0.2%.

In some embodiments, an electrode composition is provided. The electrode composition includes the above-described electrochemically active material and a binder.

In some embodiments, a negative electrode is provided. The negative electrode includes a current collector and the above-described electrode composition.

In some embodiments, an electrochemical cell is provided. The electrochemical cell includes the above-described negative electrode, a positive electrode comprising a positive electrode composition comprising lithium, and an electrolyte comprising lithium. The electrochemical cell has not undergone an initial charge/discharge cycle.

In some embodiments, a method of making an electrochemical cell is provided. The method includes providing a positive electrode comprising a positive electrode composition comprising lithium, providing a negative electrode as described above, providing an electrolyte comprising lithium, and incorporating the positive electrode, negative electrode, and the electrolyte into an electrochemical cell.

The above summary of the present disclosure is not intended to describe each embodiment of the present disclosure. The details of one or more embodiments of the disclosure are also set forth in the description below. Other features, objects, and advantages of the disclosure will be apparent from the description and from the claims.

BRIEF DESCRIPTION OF THE DRAWINGS

The disclosure may be more completely understood in consideration of the following detailed description of various embodiments of the disclosure in connection with the accompanying figures, in which.

DETAILED DESCRIPTION

Figure 1:
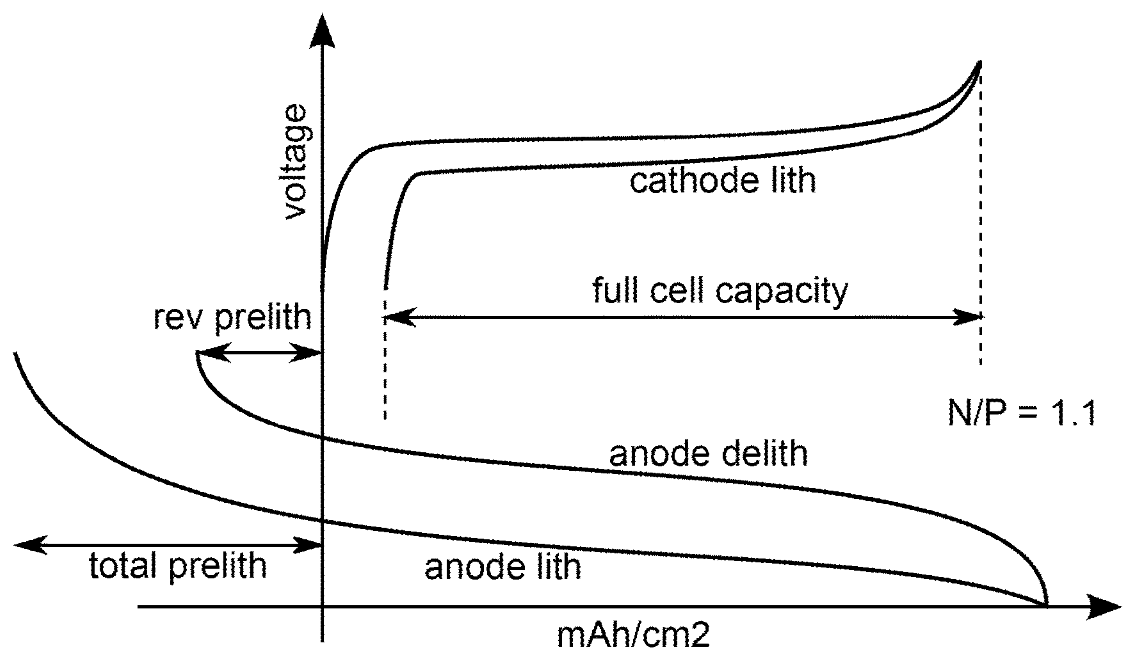
FIG. 1 shows a schematic of the voltage curve of the positive electrode (cathode) and negative electrode (anode) at the moment of full cell assembly versus lithium metal.

Electrochemically active materials that comprise elements that alloy with lithium (e.g., Mg, Ca, Sr, Ag, Zn, B, Al, C (amorphous), Si, Sn, Pb, Sb, and Bi) can be used to as negative electrode materials for high energy density cells. Most efforts to enable such alloys have been focused on improving the capacity fade which can be detected in half cells. Capacity fade in half cells is usually due to binder failure or particles disconnecting. Parasitic reactions occurring with the alloy that consume lithium will not be detected in a half cell due to the lithium reservoir provided by the lithium metal electrode. Surprisingly, it has been discovered that in full cells with well-engineered negative electrodes, a significant amount of capacity fade is due to parasitic reactions occurring at the alloy that consumes lithium irreversibly, as opposed to binder failure. Since the cathode has a finite amount of Lithium available, any parasitic reactions on the alloy result in capacity fade in the full cell. Lithium consumption at rates of 0.01% or more of the reversible capacity per cycle have been observed.

A sub-category of electrochemically active materials that include elements that alloy with Lithium are often referred to as active/inactive alloys. Active/inactive alloys that cycle reversibly as negative electrode materials in lithium-ion cells have several properties in common. For example, they are substantially homogeneous with a grain size according to the Scherrer equation of less than 15 nm. For active/inactive alloys that comprise Si, the formation of the crystalline $Li_{15}Si_4$ is suppressed at full lithiation. These alloys show reduced lithium consumption rates compared to pure Si when used as an electrochemically active material.

Past studies have focused on compensating the irreversible capacity of the alloy or negative electrode, or matching the irreversible capacities of the negative and positive electrodes. The benefit of compensating the irreversible capacity of the active material is the increased energy density of the resulting full cell. The surprising result that the majority of the capacity fade in an alloy-containing full cell is attributable to parasitic reactions from the alloy suggests that there will be a benefit to not only compensating the irreversible capacity but, further, including reversible lithium (i.e., lithium in the active phase of the alloy). Several benefits to including lithium in the active phase of the alloy have been identified. First, it contributes to longer cycle life. Parasitic reactions occurring in the cell during cycling will cause the negative electrode to slip and consume lithium. The lithium present in the active phase can be gradually consumed during the operation of the cell without cell failure as is normally seen in full cells. Additionally, the lithiated active phase promotes electronic and ionic conductivity in the alloy. Still further, the average voltage of the alloy or negative electrode in the full cell is lower than if it did not contain lithium.

Generally, the present application is directed to negative electrode compositions (e.g., for lithium ion batteries) that include an electrochemically active material that includes one or more electrochemically active chemical elements and lithium, at a point in time prior to incorporation into an electrochemical full cell (i.e., the material in a state in which it is to be incorporated into an electrochemical cell, and prior to being subjected to an initial charge/discharge cycle in the electrochemical full cell). The amount of lithium present in the electrochemically active material may be greater than that necessary to compensate for the irreversible capacity of the electrochemically active material. The amount of reversible lithium present in the electrochemically active material may be expressed as a % of the reversible capacity of the electrochemically active material. The lithium may be provided to the electrochemically active material directly (e.g. lithium inserted into a Si-based alloy). Alternatively, lithium may be provided to the negative electrode as a whole, where the negative electrode comprises an electrochemically active material that comprises one or more elements that alloy with lithium (e.g., lithiating a negative electrode comprising Si-alloy, graphite, conductive carbon, and binder in an electrochemical bath).

As used herein, the terms “lithiate” and “lithiation” refer to a process for adding lithium to an electrode material or electrochemically active phase;

the terms “delithiate” and “delithiation” refer to a process for removing lithium from an electrode material or electrochemically active phase;

the terms “charge” and “charging” refer to a process for providing electrochemical energy to a cell;

the terms “discharge” and “discharging” refer to a process for removing electrochemical energy from a cell, e.g., when using the cell to perform desired work;

the phrase “charge/discharge cycle” refers to a cycle wherein an electrochemical cell is fully charged, i.e. the cell attains it’s upper cutoff voltage and the cathode is at about 100% state of charge, and is subsequently discharged to attain a lower cutoff voltage and the cathode is at about 100% depth of discharge;

the phrase “positive electrode” refers to an electrode (often called a cathode) where electrochemical reduction and lithiation occurs during a discharging process in a full cell the phrase “negative electrode” refers to an electrode (often called an anode) where electrochemical oxidation and delithiation occurs during a discharging process in a full cell;

the term “alloy” refers to a substance that includes any or all of metals, metalloids, semimetals;

the phrase “electrochemically active material” refers to a material, which can include a single phase or a plurality of phases, that can electrochemically react or alloy with lithium under conditions possibly encountered during charging and discharging in a lithium ion battery (e.g., voltages between 0 V and 2 V versus lithium metal);

the phrase “electrochemically inactive material” refers to a material, which can include a single phase or a plurality of phases, that does not electrochemically react or alloy with lithium under conditions possibly encountered during charging and discharging in a lithium ion battery (e.g., voltages between 0 V and 2 V versus lithium metal);

the phrases “electrochemically active phase” or “active phase” refer to a phase of an electrochemically active material that that can electrochemically react or alloy with lithium under conditions possibly encountered during charging and discharging in a lithium ion battery (e.g., voltages between 0 V and 2 V versus lithium metal);

the phrases “electrochemically inactive phase” or “inactive phase” refer to a phase of an electrochemically active material that that does not electrochemically react or alloy with lithium under conditions possibly encountered during charging and discharging in a lithium ion battery (e.g., voltages between 0 V and 2 V versus lithium metal);

the phrases “electrochemically active chemical element” or “active chemical element” refer to chemical elements can electrochemically react or alloy with lithium under conditions possibly encountered during charging and discharging in a lithium ion battery (e.g., voltages between 0 V and 2 V versus lithium metal);

the phrases “electrochemically inactive chemical element” or “inactive chemical element” refer to chemical elements that do not electrochemically react or alloy with lithium under conditions possibly encountered during charging and discharging in a lithium ion battery (e.g., voltages between 0 V and 2 V versus lithium metal);

the phrase “lithiation capacity” refers to the amount of lithium that can be electrochemically added to an electrochemically active material under conditions typically encountered during charging and discharging in a lithium ion battery (e.g. at voltages between 0.005 V and 0.9 V versus lithium metal);

the phrase “delithiation capacity” refers to the amount of lithium that can be electrochemically removed from an electrochemically active material under conditions typically encountered during charging and discharging in a lithium ion battery (e.g. at voltages between 0.005 V and 0.9 V versus lithium metal);

the phrase “irreversible capacity” refers to the difference between the lithiation capacity obtained the first time the negative electrode is lithiated in an electrochemical cell and the delithiation capacity obtained the first time the negative electrode is delithiated in an electrochemical cell.

the phrase “active lithium” or “reversible lithium” refers to the lithium present in a material that can be electrochemically removed from the material at voltages between 0 V and 2 V versus lithium metal;

the phrase “inactive lithium” refers to the lithium present in a material that cannot be electrochemically removed from the material at voltages between 0 V and 2 V versus lithium metal;

the phrase “reversible capacity” refers to the amount of lithium that can be electrochemically removed from the electrochemically active material under conditions typically encountered during charging and discharging in a lithium ion battery (e.g. at voltages between 0.005 V and 0.9 V versus lithium metal);

the phrase “lithium consumption rate” or “coulombic inefficiency” refers to (1−[delithiation capacity]/[immediately preceding lithiation capacity])×100% after at least 20 cycles and at most 40 cycles when cycling a negative electrode under conditions typically encountered during charging and discharging in a lithium ion battery (e.g. at voltages between 0.005 V and 0.9 V versus lithium metal) at a temperature between 20 and 30° C. and a rate of no more than C/4 and no less than C/20. If the negative electrode is present in an electrochemical full cell, this destructive test can be performed by removing the negative electrode from the full cell and testing it in an electrochemical half cell. The lithium consumption rate can alternatively be determined non-destructively by fitting the d(voltage)/d(capacity) versus capacity plot of the full cell using reference voltage capacity curves fitting as explained in Hannah. M. Dahn, A. J. Smith, J. C. Burns, D. A. Stevens, and J. R. Dahn "User-Friendly Differential Voltage Analysis Freeware for the Analysis of Degradation Mechanisms in Li-Ion Batteries" J. Electrochem. Soc. 2012, 159, A1405-A1409, where the lithium consumption rate is given by the combined slippage and mass loss of the negative electrode;

the phrase "electrochemical half cell" refers to an electrode assembly wherein electrodes positioned at both ends of the assembly are stacked to form the cathode and anode, respectively, as shown in the structure of cathode/separator/anode or cathode/separator/anode/separator/cathode/separator/anode, and wherein the anode is lithium metal;

the phrase "electrochemical full cell" refers to an electrode assembly wherein electrodes positioned at both ends of the assembly are stacked to form the cathode and anode, respectively, as shown in the structure of cathode/separator/anode or cathode/separator/anode/separator/cathode/separator/anode, and wherein the anode is not lithium metal;

the phrase "substantially homogeneous" refers to a material in which the components or domains of the material are sufficiently mixed with one another such that the make-up of one portion of the material is substantially the same as that of any other portion of the material; and the phrase "carbon nanotubes" refers to carbon tubes with a diameter between 3 and 80 nm, the length being several times (e.g., at least 100 times) the diameter. The carbon nanotubes include layers of ordered carbon atoms and have a different core in terms of morphology. The carbon nanotubes can also be referred to as "carbon fibrils" or "hollow carbon fibers".

As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

In some embodiments, the present disclosure relates to an electrochemically active material for use in a lithium ion battery. For example, the electrochemically active material may be incorporated into a negative electrode for a lithium ion battery. For purposes of the present application, unless clearly dictated otherwise, the materials (e.g., electrochemically active materials, electrode compositions, electrodes, etc.) are described at a point in time prior to incorporation of the same into an electrochemical full cell. That is, the materials described herein are to be distinguished from those materials that have previously been subjected to one or more charge/discharge cycles in an electrochemical full cell.

In some embodiments, the electrochemically active material may include active lithium. The amount of active lithium may correspond to greater than 4%, greater than 10%, greater than 20%, or greater than 40% of the reversible capacity of the active material; or between 4% and 60%, between 4% and 50%, between 4% and 40%, between 4% and 30%, between 4% and 20%, between 4% and 10%, between 10% and 60%, between 10% and 50%, between 10% and 40%, between 10% and 30%, between 10% and 20%, between 20% and 60%, between 20% and 50%, between 20% and 40%, between 20% and 30%, between 30% and 60%, between 30% and 50%, between 30% and 40%, between 40% and 60%, between 40% and 50%, or between 50% and 60% of the reversible capacity of the active material.

In some embodiments, the active material may further include Mg, Ca, Sr, Ag, Zn, B, C (e.g., graphitic or amorphous), Al, Si, Sn, Pb, Sb, or Bi, or combinations thereof. In some embodiments, the active material comprises Si.

In some embodiments, the electrochemically active material may take the form of particles. The particles may have a diameter (or length of longest dimension) that is no greater than 60 μm, no greater than 40 μm, no greater than 20 μm, or no greater than 10 μm or even smaller; at least 0.5 μm, at least 1 μm, at least 2 μm, at least 5 μm, or at least 10 μm or even larger; or 0.5 to 10 μm, 1 to 10 μm, 2 to 10 μm, 40 to 60 μm, 1 to 40 μm, 2 to 40 μm, 10 to 40 μm, 5 to 20 μm, 10 to 20 μm, 1 to 30 μm, 1 to 20 μm, 1 to 10 μm, 0.5 to 30 μm, 0.5 to 20 μm, or 0.5 to 10 μm.

In some embodiments the electrochemically active material may take the form of particles having low surface area. The particles may have a surface area that is less than 20 $m^2/g$, less than 12 $m^2/g$, less than 10 $m^2/g$, less than 5 $m^2/g$, less than 4 $m^2/g$, or even less than 2 $m^2/g$.

In some embodiments, the electrochemically active material may be described as an active/inactive alloy, such as those described in U.S. Pat. Nos. 7,871,727, 7,906,238, 8,071,238, and 8,753,545, which are herein incorporated by reference in their entirety.

In some embodiments, the electrochemically active material may have a lithium consumption rate between 0.02% and 0.20%, between 0.05% and 0.20%, between 0.05% and 0.10%, between 0.10% and 0.15%, between 0.10% and 0.20% or between 0.15% and 0.20%. Generally, the lithium consumption rate is a measure of the amount of lithium consumed during cycling (typically consumed through parasitic reactions).

In some embodiments, the electrochemically active material, prior to incorporation of active lithium, may have an irreversible capacity of less than 50%, less than 40%, less than 30%, less than 20%, less than 15%, less than 10%, or even less than 5%. Given that the present disclosure is directed, generally, to the incorporation of reversible lithium, minimizing the irreversible capacity will minimize the total amount of lithium required and thereby maximize the total volumetric energy density of the system.

In some embodiments, the electrochemically active material may include an alloy material having the formula: $Si_xM_yC_z$, where x, y, and z represent atomic % values and a) $x>2y+z$; (b) x, y and z are greater than 0; and (c) M is at least iron and optionally one or more metals selected from manganese, molybdenum, niobium, tungsten, tantalum, copper, titanium, vanadium, chromium, nickel, cobalt, zirconium, yttrium, or combinations thereof. In some embodiments, $65\% \leq x \leq 85\%$, $70\% \leq x \leq 80\%$, $72\% \leq x \leq 74\%$, or $75\% \leq x \leq 77\%$; $5\% \leq y \leq 20\%$, $14\% \leq y \leq 17\%$, or $13\% \leq y \leq 14\%$; and $5\% \leq z \leq 15\%$, $5\% \leq z \leq 8\%$, or $9\% \leq z \leq 12\%$.

In embodiments in which the active material includes or is in the form of particles, the particles may include a coating at least partially surrounding the individual particles. By "at least partially surrounding" it is meant that there is a common boundary between the coating and the exterior of the particle. The coating can function as a chemically protective layer and can stabilize, physically and/or chemically, the components of the particles. Exemplary materials useful for coatings include amorphous carbon, graphitic carbon, LiPON glass, phosphates such as lithium phosphate ($Li_2PO_3$), lithium metaphosphate ($LiPO_3$), lithium dithionate ($LiS_2O_4$), lithium fluoride (LiF), lithium metasilicate ($LiSiO_3$), and lithium orthosilicate ($Li_2SiO_4$). The coating can be applied by milling, solution deposition, vapor phase processes, or other processes known to those of ordinary skill in the art.

In some embodiments, the above-described electrochemically active material may also be described as including an active phase and, optionally, an inactive phase. The active phase may be in the form of or include an active chemical element, an active alloy, or combinations thereof. The active phase may include one or more active chemical elements such as but not limited to Mg, Ca, Sr, Ag, Zn, B, Al, Si, Sn, Pb, Sb, or Bi, or combinations thereof. In some embodiments, the active phase may comprise Si. In some embodiments, the active phase may consist essentially of Si. In some embodiments, the active phase may further include one or more inactive chemical elements, such as but not limited to Ti, V, Cr, Mn, Fe, Co, Ni, Cu, or Zn.

In some embodiments, active phase may account for at least 30 vol. % or at least 40 vol. % of the active material based on the total volume of the active material; or between 30 vol. % and 70 vol. %, between 40 vol. % and 60 vol. %, between 40 vol. % and 55 vol. %, between 40 vol. % and 42 vol. %, or between 50 vol. % and 52 vol. %, based on the total volume of the active material. In embodiments in which the active phase includes Si, if the volume percent of the active phase is greater than 70%, the suppression of the crystalline $Li_{15}Si_4$ phase upon full lithiation may not be achieved. As previously discussed, the formation of crystalline $Li_{15}Si_4$ has been correlated with increased fade and poor coulombic efficiency. In some cases if the volume percent of the active phase is less than 30%, gains in full cell energy may not be achieved.

In some embodiments the electrochemically active material may further include an electrochemically inactive phase, such that the electrochemically active phase and the electrochemically inactive phase share at least one common phase boundary. In various embodiments, the electrochemically inactive phase may be in the form of or include one or more electrochemically inactive chemical elements, including transition metals (e.g., titanium, vanadium, chromium, manganese, iron, cobalt), alkaline earth metals, rare earth metals, or combinations thereof. In various embodiments, the electrochemically inactive phase may be in the form of an alloy. In various embodiments, the electrochemically inactive phase may include a transition metal or combination of transition metals. In some embodiments, the electrochemically inactive phase may further include one or more active chemical elements, including tin, carbon, gallium, indium, silicon, germanium, lead, antimony, bismuth, or combinations thereof. In some embodiments, the electrochemically inactive phase may include compounds such as silicides, aluminides, borides, carbides, nitrides, phosphates or stannides. The electrochemically inactive phase may include oxides, such as titanium oxide, zinc oxide, silicon oxide, aluminum oxide or sodium-aluminum oxide.

In some embodiments, each of the phases of the active material (i.e., the active phase, inactive phase, or any other phase of the active material) may include or be in the form of one or more grains. In some embodiments, the grain size of each of the phases of the active material is no greater than 50 nanometers, no greater than 20 nanometers, no greater than 15 nanometers, no greater than 10 nanometers, or no greater than 5 nanometers. As used herein, the grain sizes of the phases of an active material are as determined, as is readily understood by those skilled in the art, by X-ray diffraction and the Scherrer equation.

In some embodiments, the present disclosure is further directed to negative electrode compositions for use in lithium ion batteries. The negative electrode compositions may include the above-described electrochemically active materials. Additionally, the negative electrode compositions may include one or more additives such as binders, conductive diluents, fillers, adhesion promoters, thickening agents for coating viscosity modification such as carboxymethylcellulose, polyacrylic acid, polyvinylidene fluoride, lithium polyacrylate, carbon black, or other additives known by those skilled in the art.

In illustrative embodiments, the negative electrode compositions may include an electrically conductive diluent to facilitate electron transfer from the composition to a current collector. Electrically conductive diluents include, for example, carbons, powdered metal, metal nitrides, metal carbides, metal silicides, and metal borides, or combinations thereof. Representative electrically conductive carbon diluents include carbon blacks such as Super P and Super S carbon blacks (both from Timcal, Switzerland), Shawinigan Black (Chevron Chemical Co., Houston, Tex.), acetylene black, furnace black, lamp black, graphite, carbon fibers and combinations thereof. In some embodiments, the conductive carbon diluents may include carbon nanotubes. Surprisingly, it has been discovered that the use of carbon nanotubes as a conductive diluent in combination with the electrochemically active material of the present disclosure can reduce capacity fade and volume expansion after multiple cycles. In some embodiments, the amount of conductive diluent (e.g., carbon nanotubes) in the electrode composition may be at least 2 wt. %, at least 6 wt. %, or at least 8 wt. %, or at least 20 wt. % based upon the total weight of the electrode coating; or between 0.2 wt. % and 80 wt. %, between 0.5 wt. % and 50 wt. %, between 0.5 wt. % and 20 wt. %, or between 1 wt. % and 10 wt. %, based upon the total weight of the electrode composition.

In some embodiments, the negative electrode compositions may include graphite to improve the density and cycling performance, especially in calendered coatings, as described in U.S. Patent Application Publication 2008/0206641 by Christensen et al., which is herein incorporated by reference in its entirety. The graphite may be present in the negative electrode composition in an amount of greater than 10 wt. %, greater than 20 wt. %, greater than 50 wt. %, greater than 70 wt. % or even greater, based upon the total weight of the negative electrode composition; or between 20 wt. % and 90 wt. %, between 30 wt. % and 80 wt. %, between 40 wt. % and 60 wt. %, between 45 wt. % and 55 wt. %, between 80 wt. % and 90 wt. %, or between 85 wt. % and 90 wt. %, based upon the total weight of the electrode composition.

In some embodiments, the negative electrode compositions may also include a binder. Suitable binders include oxo-acids and their salts, such as sodium carboxymethylcellulose, polyacrylic acid, lithium polyacrylate, sodium polyacrylate, methyl acrylate/acrylic acid copolymers, lithium methyl acrylate/acrylate copolymers, and other optionally lithium or sodium neutralized polyacrylic acid copolymers. Other suitable binders include polyolefins such as those prepared from ethylene, propylene, or butylene monomers; fluorinated polyolefins such as those prepared from vinylidene fluoride monomers; perfluorinated polyolefins such as those prepared from hexafluoropropylene monomer; perfluorinated poly(alkyl vinyl ethers); perfluorinated poly(alkoxy vinyl ethers); or combinations thereof. Other suitable binders include polyimides such as the aromatic, aliphatic or cycloaliphatic polyimides and polyacrylates. The binder may be crosslinked. In some embodiments, the amount of binder in the electrode composition may be at least 3 wt. %, at least 5 wt. %, at least 10 wt. %, or at least 20 wt. % based upon the total weight of the electrode coating; less than 30 wt. %, less than 20 wt. %, or less than 10 wt. %, based upon the total weight of the electrode composition; or between 3 wt. % and 30 wt. %, between 3 wt. % and 20 wt. %, or between 3 wt. % and 10 wt. %, based upon the total weight of the electrode composition.

In some embodiments, the present disclosure is further directed to negative electrodes for use in lithium ion electrochemical cells. The negative electrodes may include a current collector having disposed thereon the above-described negative electrode composition. The current collector may be formed of a conductive material such as a metal (e.g., copper, aluminum, nickel), or a carbon composite.

In some embodiments, the present disclosure further relates to lithium ion electrochemical cells. In addition to the above-described negative electrodes, the electrochemical cells may include a positive electrode, an electrolyte, and a separator. In the cell, the electrolyte may be in contact with both the positive electrode and the negative electrode, and the positive electrode and the negative electrode are not in physical contact with each other; typically, they are separated by a polymeric separator film sandwiched between the electrodes.

In some embodiments, the positive electrode may include a current collector having disposed thereon a positive electrode composition that includes a lithium transition metal oxide intercalation compound such as $LiCoO_2$, $LiCO_{0.2}Ni_{0.8}O_2$, $LiMn_2O_4$, $LiFePO_4$, $LiNiO_2$, or lithium mixed metal oxides of manganese, nickel, and cobalt in any proportion. Blends of these materials can also be used in positive electrode compositions. Other exemplary cathode materials are disclosed in U.S. Pat. No. 6,680,145 (Obrovac et al.) and include transition metal grains in combination with lithium-containing grains. Suitable transition metal grains include, for example, iron, cobalt, chromium, nickel, vanadium, manganese, copper, zinc, zirconium, molybdenum, niobium, or combinations thereof with a grain size no greater than about 50 nanometers.

In various embodiments, useful electrolyte compositions may be in the form of a liquid, solid, or gel. The electrolyte compositions may include a salt and a solvent (or charge-carrying medium). Examples of solid electrolyte solvents include polymers such as polyethylene oxide, polytetrafluoroethylene, fluorine-containing copolymers, and combinations thereof. Examples of liquid electrolyte solvents include ethylene carbonate, diethyl carbonate, propylene carbonate, fluoroethylene carbonate, tetrahydrofuran (THF), acetonitrile, and combinations thereof. In some embodiments the electrolyte solvent may comprise glymes, including monoglyme, diglyme and higher glymes, such as tetraglyme Examples of suitable lithium electrolyte salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof.

In some embodiments, the lithium ion electrochemical cells may further include a microporous separator, such as a microporous material available from Celgard LLC, Charlotte, N.C. The separator may be incorporated into the cell and used to prevent the contact of the negative electrode directly with the positive electrode.

The disclosed lithium ion electrochemical cells can be used in a variety of devices including, without limitation, portable computers, tablet displays, personal digital assistants, mobile telephones, motorized devices (e.g., personal or household appliances and vehicles), instruments, illumination devices (e.g., flashlights) and heating devices. One or more lithium ion electrochemical cells of this disclosure can be combined to provide a battery pack.

The present disclosure further relates to methods of making the above-described electrochemically active materials. In some embodiments, the materials can be made by methods known to produce films, ribbons or particles of metals or alloys including cold rolling, arc melting, resistance heating, ball milling, sputtering, chemical vapor deposition, thermal evaporation, atomization, induction heating or melt spinning. The above described active materials may also be made via the reduction of metal oxides or sulfides.

The present disclosure further relates to methods of making negative electrodes that include the above-described negative electrode compositions. In some embodiments, the method may include mixing the above-described electrochemically active materials, along with any additives such as binders, conductive diluents, fillers, adhesion promoters, thickening agents for coating viscosity modification and other additives known by those skilled in the art, in a suitable coating solvent such as water or N-methylpyrrolidinone to form a coating dispersion or coating mixture. The dispersion may be mixed thoroughly and then applied to a foil current collector by any appropriate coating technique such as knife coating, notched bar coating, dip coating, spray coating, electrospray coating, or gravure coating. The current collectors may be thin foils of conductive metals such as, for example, copper, aluminum, stainless steel, or nickel foil. The slurry may be coated onto the current collector foil and then allowed to dry in air or vacuum, and optionally by drying in a heated oven, typically at about 80° to about 300° C. for about an hour to remove the solvent.

Several routes may be employed for including lithium in the electrochemically active material or the negative electrode composition, including incorporating lithium into the synthesis of the electrochemically active material or the negative electrode composition in the form of metallic lithium. As additional example, lithium can be incorporated in the synthesis of the electrochemically active material or the negative electrode composition in the form of lithium vapor, by placing lithium foil and electrolyte in contact with the material, or by placing stabilized lithium metal powder in contact with the material. Further examples include lithium incorporation through an electrochemical lithiation bath as described in U.S. Pat. App. Pub. 2013/0327648 and U.S. Pat. No. 8,133,374, which are herein incorporated by reference in their entirety.

The present disclosure further relates to methods of making lithium ion electrochemical cells. In various embodiments, the method may include providing a negative electrode as described above, providing a positive electrode that includes lithium, and incorporating the negative electrode and the positive electrode into an electrochemical cell comprising a lithium-containing electrolyte.

The operation of the present disclosure will be further described with regard to the following detailed examples. These examples are offered to further illustrate various specific embodiments and techniques. It should be understood, however, that many variations and modifications may be made while remaining within the scope of the present disclosure.

EXAMPLES

Prophetic Example 1

A cell model is used to determine the impact of the lithium consumption rate and the prelithiated reversible lithium on the energy density of a full cell after cycling.

FIG. 1 shows a schematic of the voltage curve of the positive electrode (cathode) and negative electrode (anode) at the moment of full cell assembly versus lithium metal. The discharge voltage curve of the full cell would be given by the difference between the cathode lithiation curve and the anode delithiation curve. In FIG. 1, the anode has been prelithiated by an amount labelled "total prelithiation", which not only compensates for the irreversible capacity but allows for prelithiated reversible lithium labelled "rev prelith". Initially the available discharge capacity from the full cell labelled "initial full cell capacity" is limited by the cathode lithiation curve. Parasitic reactions occur on the negative electrode as the full cells is cycled and cause lithium consumption resulting in the anode slipping relative to the cathode.

Figure 2:
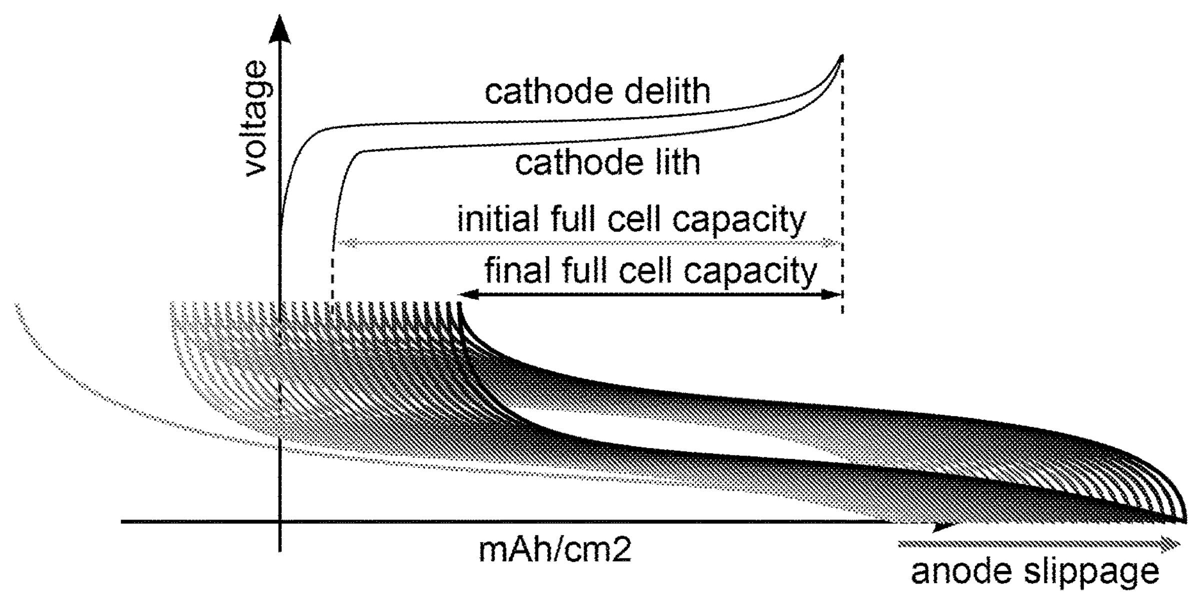
FIG. 2 shows a schematic of the impact on an electrochemical full cell of lithium consumption at the negative electrode with cycling.

FIG. 2 schematically shows the impact of lithium consumption at the anode with cycling. As the anode slips the full cell discharge capacity ends up being limited by the anode delithiation labelled as "final full cell capacity". For a given negative electrode with a known Lithium consumption rate, the prelithiation amount and the anode mAh/cm$^2$ can be chosen in order to maximize the energy density of the full cell after a given number of cycles.

An estimate of achievable Wh/L can be calculated with the cell model. The cell model assumes a double sided positive electrode of 2.6 mAh/cm$^2$ with an average voltage of 3.95 V, a double sided negative electrode with a capacity such that N/P=1.1 (where N/P is the negative electrode first lithiation capacity, after the lithium has been added to the active phase, divided by the positive electrode first charge capacity), a fixed lithium consumption rate, a 16 μm separator, 10 μm current collectors. The calculated output is the energy density in Wh/L of the cell stack (2 separators, one double sided negative electrode and one double sided positive electrode) after a given number of cycles.

Figure 3:
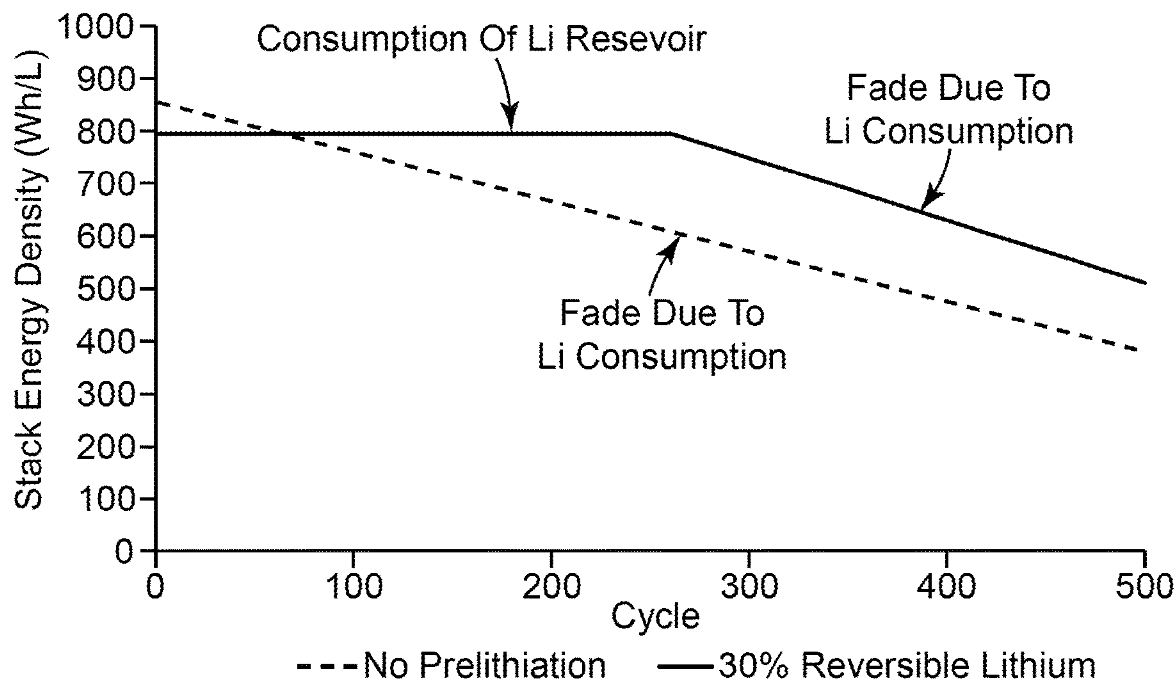
FIG. 3 shows the energy density as a function of cycle from a cell model for a standard full cell (No prelithiation) and for a full cell with a negative electrode prelithiated such that reversible Lithium representing 30% of the reversible capacity of the electrode was present at the moment of cell assembly.

FIG. 3 shows the energy density as a function of cycle from the cell model for a standard cell (No prelithiation) and for a full cell with an anode prelithiated such that reversible Lithium representing 30% of the reversible capacity of the electrode was present at the moment of cell assembly. In both cases a fixed lithium consumption rate of 0.10% was used. FIG. 3 shows that for the prelithiated case in the first 365 cycles there is no fade as the lithium consumption only consumes the prelithiated Lithium. Once the prelithiated Lithium is consumed, the fade rate is similar to a standard cell without prelithiation. Although the prelithiated cell initially has a lower energy density, after 500 cycles the energy density is higher than the standard cell with no prelithiation.

Figure 4:
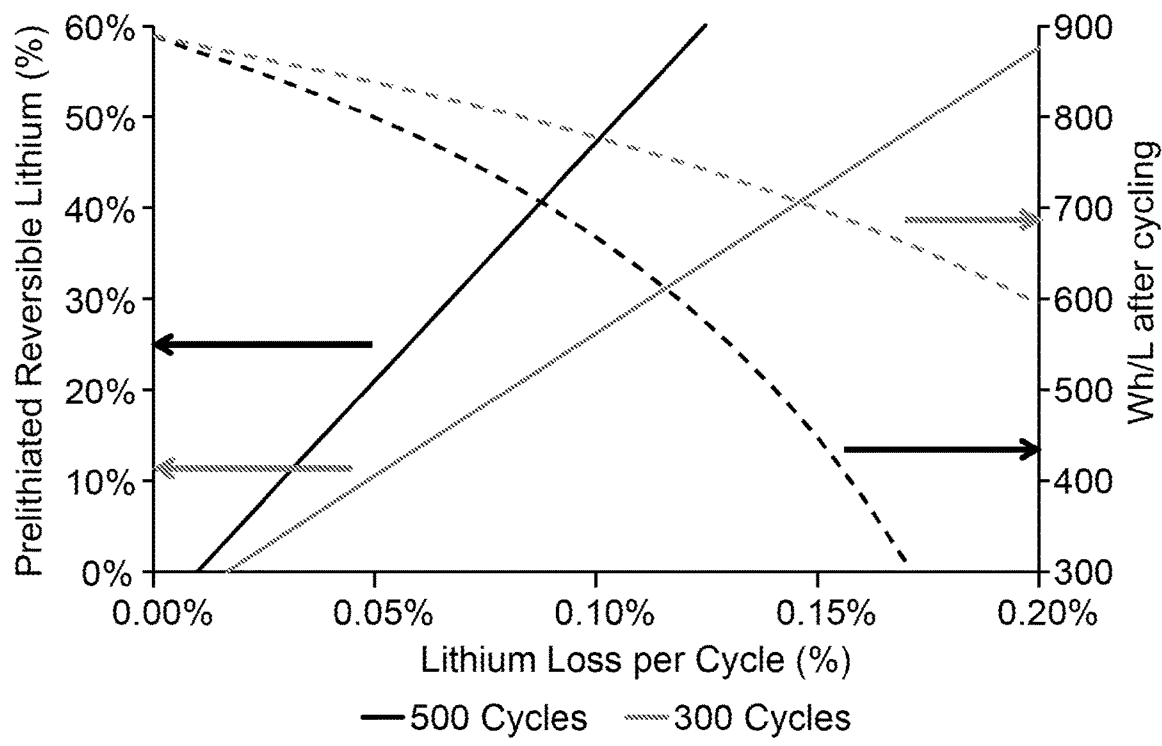
FIG. 4 shows the calculated amount of prelithiation required (solid lines) to maximize the energy density after 300 (grey) or 500 (black) cycles for a given lithium consumption rate as well as the stack energy density in Wh/L (dotted lines) of the cells after 300 (grey) and 500 (black) cycles.

The cell model can also be used to determine the amount of prelithiation required to maximize the energy density of a cell stack after a given number of cycles. Capacity retention after 300 cycles and 500 cycles are common metrics for commercial cells. FIG. 4 shows the amount of prelithiation required (solid lines) to maximize the energy density after 300 (grey) or 500 (black) cycles for a given lithium consumption rate. FIG. 4 also shows the stack energy density in Wh/L (dotted lines) of the cells after 300 (grey) and 500 (black) cycles. The amount of prelithiation required is surprisingly large. The black solid line is therefore an upper bound on the amount of prelithiation required for a given lithium consumption rate.

Graphite as a negative electrode material has a Lithium consumption rate which can be sufficiently low so as to not require prelithiation and still provide acceptable cycle life (>80% at 500 cycles). Si nanoparticles as presented in U.S. Pat. No. 8,241,793 have been shown to have Lithium consumption rates so large (>>0.2%) that the amount of prelithiation required to reach acceptable retention at 500 cycles would result in low energy density.

Experimental Examples

Negative Electrode Preparation

An alloy of composition $Si_{75}Fe_{14}C_{11}$ was produced by low energy ball milling using the same general procedure as disclosed in U.S. Pat. No. 7,906,238B2 (Le). The Si alloy has an active phase volume of 50% as determined using the methodology of M. N. Obrovac, L. Christensen, D. B. Le, and J. R. Dahn, J. Electrochem. Soc. 2007, 154, A849.

A binder solution was prepared as follows: 35 wt % aqueous solution of polyacrylic acid (PAA) (250K MW, Aldrich), de-ionized water, and lithium hydroxide monohydrate (Aldrich) were mixed in a 1.00:2.48:0.20 weight ratio, and placed in a shaker for 5 hours. The resulting solution is a 10 wt % LiPAA aqueous binder solution.

Negative electrodes (N1, N2 and N3) were prepared by mixing the Si alloy, MAGE Graphite (available from Hitachi Chemical, Cupertino, Calif.) and LiPAA (48:42:10 wt %) in a Ross PD-2 mixer with an adequate amount of water to produce a slurry suitable for coating. The slurry was coated on 15 μm Cu foil using a TM-MC coater (Hirano Tecseed Co Ltd, Japan). The electrodes were dried at 120° C. under vacuum for 2 hours.

Another negative electrode (N4) was made by mixing 20 wt % Si nanoparticles (Si 98+%, 50-70 nm available from Nanostructured and Amorphous Materials Inc., TX, USA), 68 wt % MAGE Graphite, 2 wt % Super P (available from Timcal, Switzerland), and 10 wt % LiPAA in a Kurabo Mazerustar KK-2505 with a total of 4 g of solids in a 250 mL cup. The cup did not contain any balls and the slurry was mixed on setting 6 for two 15 minutes cycles. Deionized water was added as needed to reach a desirable coating consistency. The resulting slurry was then coated onto a copper foil using a coating bar and dried at 120° C. under vacuum for 2 hours Coin half cells (2325 type) were prepared. Disks (16 mm diameter) were cut from the electrode coatings for use in 2325-button cells. Each 2325 cell contained a 18 mm diameter disk of Cu as a spacer (900 μm thick), a 16 mm diameter disk of the alloy electrode, one 20 mm diameter microporous separator (CELGARD 2400; Separation Products, Hoechst Celanese Corp., Charlotte, N.C. 28273), 18 mm diameter disk of lithium (0.38 mm thick lithium ribbon; Aldrich Chemicals, Milwaukee, Wis.) and an 18 mm copper spacer (900 μm thick). One hundred micro liters of electrolyte solution (90 wt % Selectilyte LP 57 available from BASF, Independence OH and; 10 wt % fluoroethylene carbonate (FEC) available from Fujian Chuangxin Science and Technology Development, LTP, Fujian, China) was used.

The coin cells were then cycled using a Maccor 4000 Series charger. The first two cycles were performed at C/10 with a C/40 trickle at 5 mV and a delithiation up to 1.5V, subsequent cycles were performed at C/4 with a C/20 trickle at 5 mV and a delithiation up to 0.9 V.

Table 1 lists the thickness of the coatings (not including the current collector), the first lithiation capacity, first delithiation capacity the capacity retention after twenty cycles and the Lithium consumption rate at 21 cycles.

TABLE 1

| Electrode | Thickness of coating at 30% porosity (um) | First Lithiation capacity (mAh/cm2) | Delithiation Capacity (mAh/cm2) | Capacity retention after 20 cycles* | Lithium Consumption Rate at Cycle 21 |
|---|---|---|---|---|---|
| N1 | 22 | 3.07 | 2.74 | 98.8% | 0.20% |
| N2 | 30 | 4.01 | 3.60 | 97.6% | 0.05% |
| N3 | 45 | 6.33 | 5.67 | 95.8% | 0.13% |
| N4 | 24 | 3.48 | 3.18 | 89.2% | 2.16% |

Negative Electrode Lithiation

Three coin half cells were then assembled as described above using each of the original electrodes N1, N2, N3, and N4. These electrodes in these coin half cells were lithiated by discharging the half cells at a rate of C/10 until the capacities listed in column 2 of Table 2 were reached.

TABLE 2

| Electrode | Lithiation in half cell ($mAh/cm^2$) | Lithium content (% (irreversible + reversible capacity)) | Lithium in active phase (% reversible) | Remaining lithiation capacity ($mAh/cm^2$) |
|---|---|---|---|---|
| N1L | 0.18 | 6% | 0% | 2.9 |
| N2L | 1.16 | 29% | 21% | 2.9 |
| N3L | 3.45 | 55% | 49% | 2.9 |
| N4L | 0.85 | 22% | 14% | 2.6 |

Positive Electrode Preparation

A positive electrode (P1) was prepared by mixing $LiCoO_2$ (Umicore, Belgium) Super P (Timcal, Switzerland) and polyvinylidene fluoride (Kynar 761 from Arkema, France) (96:2:2 wt %) in a Ross PD-2 mixer with an adequate amount of N-methyl-2-pyrrolidone (NMP from Sigma Aldrich, St Louis Mo.) to produce a slurry suitable for coating. The slurry was coated on 15 μm aluminum foil using a TM-MC coater (Hirano Tecseed Co Ltd, Japan). This electrode was dried at 120° C. under vacuum for 2 hours. The electrode had a first charge capacity of 2.6 $mAh/cm^2$ when using a 4.35 V cutoff versus lithium metal.

Full Cell Preparation

Figure 5:
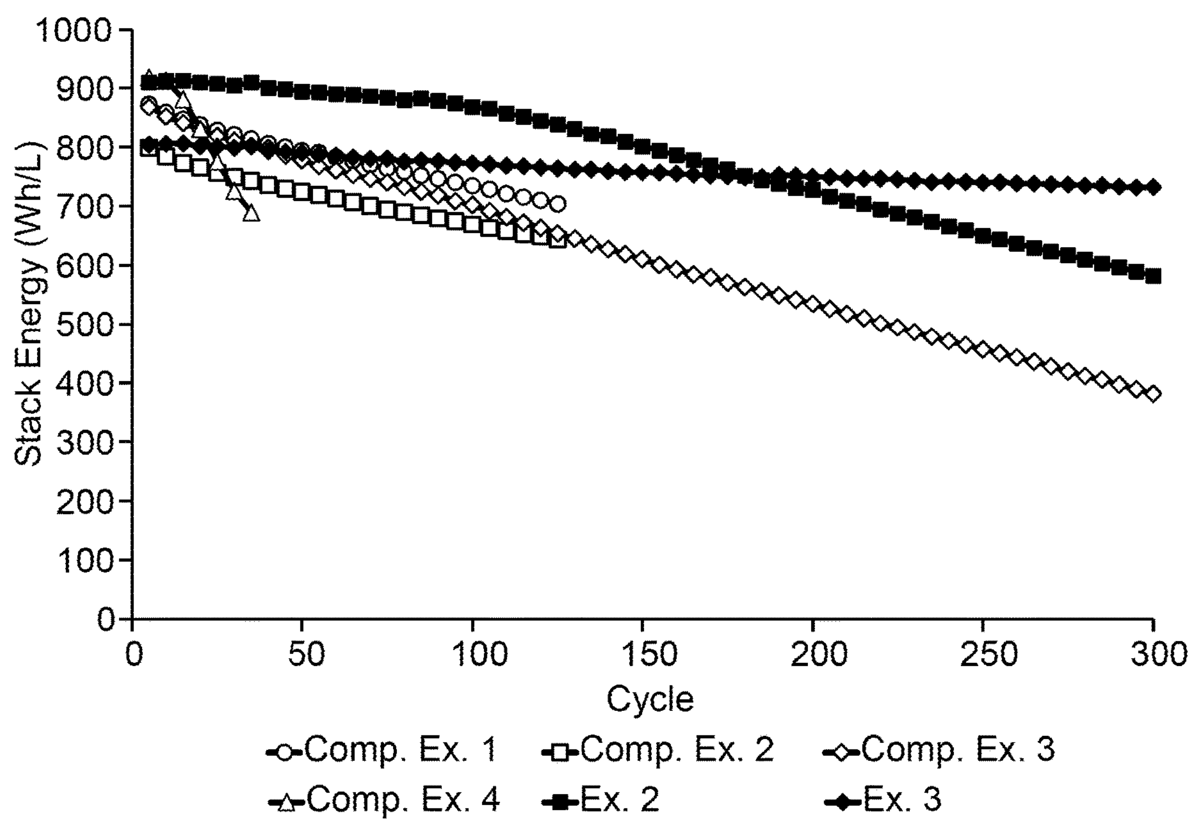
FIG. 5 shows the stack energy density with cycle number of electrochemical full cells with and without prelithiation constituting examples and comparative examples.

The coin half cells were then disassembled and the electrodes were used in coin full cells (2325 type) that employed the P1 electrode and as outlined in Table 3 below. Each 2325 cell contained a 18 mm diameter disk of Cu as a spacer (760 μm thick), a 16 mm diameter disk of the alloy electrode, two 20 mm diameter microporous separator (CELGARD 2325; Separation Products, Hoechst Celanese Corp., Charlotte, N.C. 28273), 16 mm diameter disk P1 electrode and an 18 mm aluminum spacer (790 μm thick). One hundred micro liters of electrolyte solution (90 wt % Selectilyte LP 57 available from BASF, Independence OH and; 10 wt % fluoroethylene carbonate (FEC) available from Fujian Chuangxin Science and Technology Development, LTP, Fujian, China) was used. These full cells were then used in the examples described below Full Cell Testing Full cells were cycled on a Maccor 4000 Series cycler with the following protocol, where C=170 mA/g, CC=constant current, CV=constant voltage Loop:

Charge 0.05 C CC to 4.35V
15 min rest
Discharge 0.05 C CC to 2.75V
15 min rest
For 49 iterations:
Charge 0.5 C CC to 4.10V CV to 0.2 C
Charge 0.2 C CC to 4.20V CV to 0.1 C
Charge 0.1 C CC to 4.35V CV to 0.025 C
15 min rest
Discharge CC 0.5 C, 2.75V
15 min rest The results of the cycling tests are shown in Table 3 and FIG. 5 below. It is noted that N/P is the negative electrode first lithiation capacity, after the lithium has been added to the active phase (if prelithiation occurred), divided by the positive electrode first delithiation capacity. FIG. 5 shows that the maximal energy density is obtained after 300 cycles when exemplifying the current invention.

TABLE 3

| Example | Positive Electrode | Negative Electrode | N/P |
|---|---|---|---|
| Comparative Ex 1 | P1 | N1 | 1.18 |
| Comparative Ex 2 | P1 | N2 | 1.54 |
| Comparative Ex 3 | P1 | N1L | 1.12 |
| Comparative Ex 4 | P1 | N4L | 1.00 |
| Example 1 | P1 | N2L | 1.12 |
| Example 2 | P1 | N3L | 1.12 |

What is claimed:

1. An electrochemically active material, the material comprising:

prior to incorporation in an electrochemical full cell, reversible lithium corresponding to between 4% and 50% of the reversible capacity of the electrochemically active material; and prior to incorporation of active lithium, an irreversible capacity of less than 15%;

wherein the electrochemically active material has a lithium consumption rate between 0.02% and 0.2%; and wherein the electrochemically active material comprises Si.

2. The electrochemically active material of claim 1, wherein the electrochemically active material comprises Mg, Ca, Sr, Ag, Zn, B, C, Al, Sn, Pb, Sb, or Bi, or combinations thereof.

3. The electrochemically active material according to claim 1, wherein the electrochemically active material comprises an electrochemically active phase comprising Mg, Ca, Sr, Ag, Zn, B, C, Al, Si, Sn, Pb, Sb, or Bi, or combinations thereof.

4. The electrochemically active material according to claim 3, wherein the active phase is between 30 vol. % and 70 vol. % of the electrochemically active material, based on the total volume of the active material.

5. The electrochemically active material according to claim 3, wherein the active phase is between 40 vol. % and 60 vol. % of the electrochemically active material, based on the total volume of the active material.

6. The electrochemically active material according to claim 3, wherein the active phase is between 40 vol. % and 55 vol. % of the electrochemically active material, based on the total volume of the active material.

7. The electrochemically active material according to claim 3, wherein the active phase is between 48 vol. % and 52 vol. % of the electrochemically active material, based on the total volume of the active material.

8. The electrochemically active material according to claim 3, wherein the active phase comprises one or more grains, and wherein the grain size of the grains of the active phase is no greater than 15 nanometers.

9. The electrochemically active material according to claim 1, wherein the electrochemically active material comprises reversible lithium corresponding to at least 10% of the reversible capacity of the electrochemically active material.

10. The electrochemically active material according to claim 1, wherein the electrochemically active material comprises reversible lithium corresponding to less than 40% of the reversible capacity of the electrochemically active material.

11. The electrochemically active material according to claim 1, wherein the electrochemically active material has a lithium consumption rate of greater than 0.05%.

12. The electrochemically active material according to claim 1, wherein the electrochemically active material has a lithium consumption rate of greater than 0.10%.

13. The electrochemically active material according to claim 1, wherein the electrochemically active material comprises an alloy having the formula: $Si_xM_yC_z$, where x, y, and z represent atomic % values and a) $x>2y+z$; (b) x, y and z are greater than 0; and (c) M is at least iron and optionally one or more metals selected from manganese, molybdenum, niobium, tungsten, tantalum, copper, titanium, vanadium, chromium, nickel, cobalt, zirconium, yttrium, or combinations thereof.

14. An electrode composition comprising:

the electrochemically active material according to claim 1; and a binder.

15. An electrode composition according to claim 14, further comprising carbon nanotubes.

16. An electrode composition according to claim 15, wherein the carbon nanotubes are present in the electrode composition in an amount of between 0.2 wt. % and 20 wt. %, based on the total weight of the electrode composition.

17. An electrode composition according to claim 14, further comprising graphite.

18. A negative electrode comprising:

the electrode composition according to claim 14; and a current collector.

19. An electrochemical cell comprising:

the negative electrode of claim 18;

a positive electrode comprising a positive electrode composition comprising lithium; and an electrolyte comprising lithium;

wherein the electrochemical cell has not undergone an initial charge/discharge cycle.

20. An electronic device comprising the electrochemical cell according to claim 19.

* * * * *